US012810497B2

(12) United States Patent
Terasawa et al.

(10) Patent No.: US 12,810,497 B2
(45) Date of Patent: Nov. 24, 2026

(54) CHART GENERATION METHOD AND INFORMATION PROCESSING APPARATUS

(71) Applicant: Tokyo Electron Limited, Tokyo (JP)

(72) Inventors: Nobutoshi Terasawa, Hokkaido (JP); Kazushi Shoji, Hokkaido (JP); Nao Akashi, Hokkaido (JP); Shintaro Saruwatari, Hokkaido (JP); Motokatsu Miyazaki, Yamanashi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 310 days.

(21) Appl. No.: 18/220,757

(22) Filed: Jul. 11, 2023

(65) Prior Publication Data

US 2024/0020895 A1 Jan. 18, 2024

(30) Foreign Application Priority Data

Jul. 14, 2022 (JP) ................................ 2022-113441

(51) Int. Cl.
*G06T 11/26* (2026.01)
*G06F 11/30* (2006.01)

(52) U.S. Cl.
CPC .......... *G06T 11/26* (2026.01); *G06F 11/3089* (2013.01); *G06F 11/3075* (2013.01)

(58) Field of Classification Search
CPC ..................................................... G06T 11/206
See application file for complete search history.

(56) References Cited

U.S. PATENT DOCUMENTS

| | | | | |
|---|---|---|---|---|
| 10,249,069 | B1 * | 4/2019 | Kerzner | G06V 20/52 |
| 11,526,261 | B1 * | 12/2022 | Leach | G06F 17/18 |
| 2013/0110263 | A1 * | 5/2013 | Schulze | G05B 19/41875 700/79 |
| 2014/0282195 | A1 * | 9/2014 | Nixon | G06F 3/0484 715/771 |
| 2019/0235482 | A1 * | 8/2019 | Subramaniyan | G05B 23/0243 |
| 2020/0342230 | A1 * | 10/2020 | Tsai | G08G 1/0141 |
| 2021/0358785 | A1 * | 11/2021 | Merton | H01J 37/32926 |
| 2021/0406041 | A1 * | 12/2021 | Saraiya | G06F 16/287 |

FOREIGN PATENT DOCUMENTS

| | | | |
|---|---|---|---|
| JP | 2004341598 | A | 12/2004 |
| JP | 2016184319 | A | 10/2016 |
| JP | 2020095328 | A | 6/2020 |
| JP | 2021-068831 | A | 4/2021 |

OTHER PUBLICATIONS

Sia, "Semiconductor Frequently Asked Questions", https://web.archive.org/web/20210521213101/https://www.semiconductors.org/semiconductors-101/frequently-asked-questions/, May 21, 2021. (Year: 2021).*

* cited by examiner

*Primary Examiner* — Michelle L Sams
(74) *Attorney, Agent, or Firm* — Venjuris, P.C.

(57) ABSTRACT

A chart generation method includes: extracting history information for sensor data detected from an apparatus that corresponds to the state of the apparatus at the time when a specific event has occurred; generating a chart representing time-series data obtained by statistically processing the extracted sensor data history information with reference to a memory unit that defines a statistical processing technique; and displaying the generated chart on a display unit.

13 Claims, 8 Drawing Sheets

312

| STATE OF APPARATUS | DEFINITION |
|---|---|
| LEAK CHECKING | HALT OF ALL GAS FLOWS AND MAKING PRESSURE IN APPARATUS ONE Pa OR LESS |
| FILM-DEPOSITING | PROCESSING GAS (FILM DEPOSITION GAS) BEING SUPPLIED |
| TEMPERATURE INCREASING | ... |
| ... | ... |

FIG. 8

313

| STATISTICAL PROCESSING TECHNIQUE | DEFINITION |
|---|---|
| TECHNIQUE 1 | MEAN |
| TECHNIQUE 2 | MAXIMUM |
| TECHNIQUE 3 | INTEGRATED VALUE |
| TECHNIQUE 4 | STANDARD DEVIATION |
| ... | ... |

FIG. 9

| Sensor Feature Table | | |
|---|---|---|
| Sensor | | SENSOR DATA |
| MFC-O1 | | 0.590653944 |
| MFC-O1 | | 0.590639135 |
| MFC-O1 | | 0.59063792 |
| MFC-O1 | | 0.590637909 |
| STATISTICAL PROCESSING TECHNIQUE | ALARM SCORE/TREND SCORE | CALCULATED VALUE |
| MFC-O1 MEAN | 1/1 | 0.590642227 |
| MFC-O1 MAXIMUM | 0.9/0.9 | 0.590653944 |
| MFC-O1 MINIMUM | 0.8/0.7 | 0.590637909 |
| MFC-O1 STANDARD DEVIATION | 1/1 | 0.00242033 |

CHART GENERATION METHOD AND INFORMATION PROCESSING APPARATUS

CROSS-REFERENCE TO RELATED APPLICATIONS

The present application is based on and claims priority from Japanese Patent Application No. 2022-113441, filed on Jul. 14, 2022, with the Japan Patent Office, the disclosure of which is incorporated herein in its entirety by reference.

TECHNICAL FIELD

The present disclosure relates to a chart generation method and an information processing apparatus.

BACKGROUND

Japanese Patent Laid-Open Publication No. 2021-068831 discloses a failure detection system that identifies or recognizes failures or malfunctions in a sensor used for detecting the condition or situation of a semiconductor manufacturing apparatus. The failure detection system includes a generation unit that generates time-series data of information regarding a detection value of a sensor during a determination period, a calculation unit that calculates a regression line of the generated time-series data, and a failure determination unit that determines whether the sensor has failed based on the slope of the regression line.

SUMMARY

According to an aspect of the present disclosure, a chart generation method includes extracting history information for sensor data detected from an apparatus that corresponds to a state of an apparatus at the time when a specific event has occurred, generating a chart representing time-series data obtained by statistically processing the extracted sensor data history information with reference to a memory unit that defines a statistical processing technique, and displaying the generated chart on a display unit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 8 is a diagram illustrating an example of statistical processing technique definition information.

FIG. 9 is a diagram illustrating an example of results obtained by a statistical technique for sensor data.

DETAILED DESCRIPTION

Figure 1:
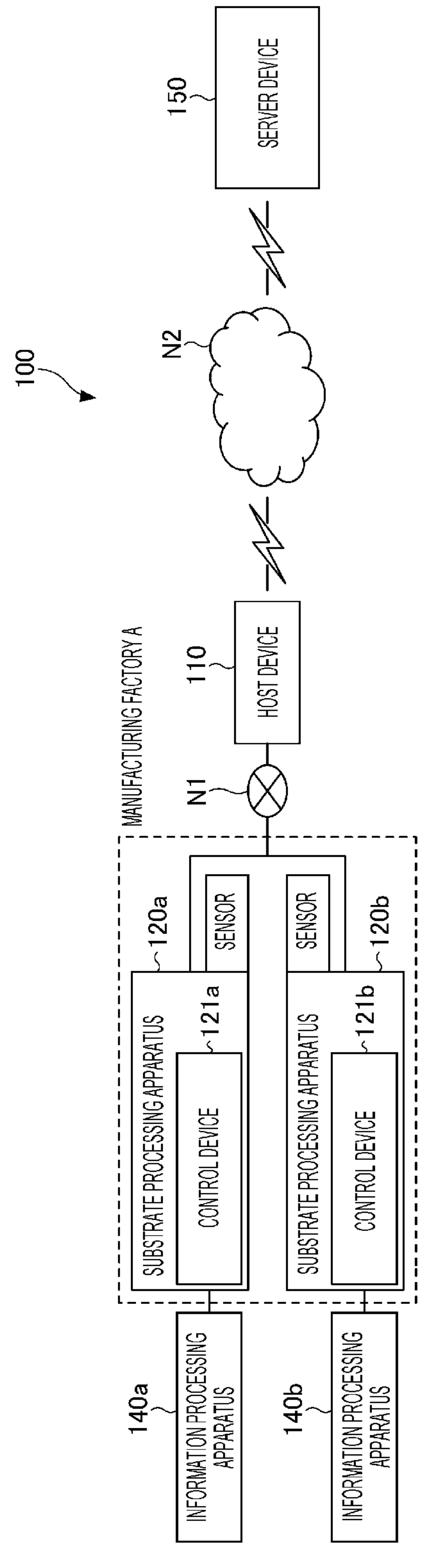
FIG. 1 is a diagram illustrating an exemplary configuration of a substrate processing system according to one embodiment.

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Embodiments for carrying out aspects of the present disclosure are described below with reference to the accompanying drawings. The same reference numerals are used to indicate the same components across the drawings, and repetitive descriptions may be omitted for brevity.

<Substrate Processing System>

An exemplary configuration of a substrate processing system according to one embodiment is now described. FIG. 1 is a diagram illustrating an exemplary configuration of a substrate processing system 100 according to one embodiment. As illustrated in FIG. 1, the substrate processing system 100 includes a substrate processing apparatus and a control device. The substrate processing apparatus 120*a* and 120*b* and their corresponding control devices 121*a* and 121*b* are situated within a manufacturing factory A. The substrate processing apparatus 120*a* and the control device 121*a* are connected via wire or wireless connections. The substrate processing apparatus 120*b* and the control device 121*b* are connected via wire or wireless connections.

The control device 121*a* may be provided within the substrate processing apparatus 120*a*. The control device 121*b* may be provided outside the substrate processing apparatus 120*b*. Additionally, the substrate processing system 100 may have other substrate processing apparatuses and control devices in the same manufacturing factory A or other manufacturing factories.

The substrate processing apparatuses 120*a* and 120*b* are connected to a host device 110 via a network N1. The substrate processing apparatus 120*a* performs a substrate processing under the control of the control device 121*a*, following an instruction from the host device 110. Similarly, the substrate processing apparatus 120*b* performs a substrate processing under the control of the control device 121*b*, following an instruction from the host device 110. The host device 110 is connected to a server device 150 over a network N2 such as the Internet. Throughout the subsequent description, the substrate processing apparatuses 120*a* and 120*b* are also collectively referred to as a "substrate processing apparatus 120." Additionally, the control device 121*a* and 121*b* are also collectively referred to as "control device 121."

The sensor data obtained from a sensor that detects the state of the substrate processing apparatus 120 is managed separately for each individual substrate processing apparatus 120. Further, these multiple sensor data items are accumulated within their respective corresponding substrate processing apparatus 120. Multiple data items managed individually by the substrate processing apparatus 120 include history information regarding the history of the sensor data. Using the sensor data facilitates the automatic generation of a statistical process control (SPC) chart, as described later.

To visualize the SPC chart, various display devices may be employed, including a display unit 205 (see FIG. 2) of an information processing apparatus 140, a display unit of the substrate processing apparatus 120, a display unit of the control device 121, or a display unit of another apparatus. The description in the present embodiment presents an example of an automatically generated SPC chart that is displayed on the display unit 205 of the information processing apparatus 140.

The control device 121 processes a computer-executable instruction that directs the substrate processing apparatus 120 to carry out a substrate processing of various processes, including film deposition and etching. The control device 121 may control individual components of the substrate processing apparatus 120, enabling them to execute various processes. In one embodiment, the entirety or part of the control devices 121 may be included in the substrate processing apparatus 120. The control device 121 may include a processor, a memory unit, and a communication interface. The control device 121 is implemented as, for example, a computer. The processor may read a program from the memory unit and execute the read program, carrying out various control operations. This program may be pre-stored in the memory unit or acquired as necessary through a suitable medium. Once acquired, the program is stored in the memory unit and then loaded from the memory unit for execution by the processor. Examples of such a medium may include various computer-readable storage media or a communication line connected to a communication interface. The processor may be a central processing unit (CPU). The memory unit may include random-access memory (RAM), read-only memory (ROM), a hard disk drive (HDD), a solid-state drive (SSD), or a combination thereof. The communication interface enables communication with the substrate processing apparatus 120 over a communication line such as a local area network (LAN).

The substrate processing apparatus 120*a* is connected to an information processing apparatus 140*a*. The information processing apparatus 140*a* acquires multiple sensor data items managed by the substrate processing apparatus 120*a* and stores them in a data storage unit 311 (refer to FIG. 3) of the information processing apparatus 140*a*. Similarly, the substrate processing apparatus 120*b* is connected to an information processing apparatus 140*b*. The information processing apparatus 140*b* acquires multiple sensor data items managed by the substrate processing apparatus 120*b* and stores them in a data storage unit 311 of the information processing apparatus 140*b*. In the following description, the information processing apparatuses 140*a* and 140*b* are also collectively referred to as "information processing apparatus 140." The substrate processing apparatus 120 and the information processing apparatus 140 may be connected in a one-to-one manner, or a plurality of substrate processing apparatuses 120 may be connected to a single information processing apparatus 140 in a many-to-one manner Alternatively, instead of providing the information processing apparatus 140, the host device 110 or the server device 150 may fulfill the role of the information processing apparatus 140.

<Hardware Configuration of Information Processing Apparatus>

Figure 2:
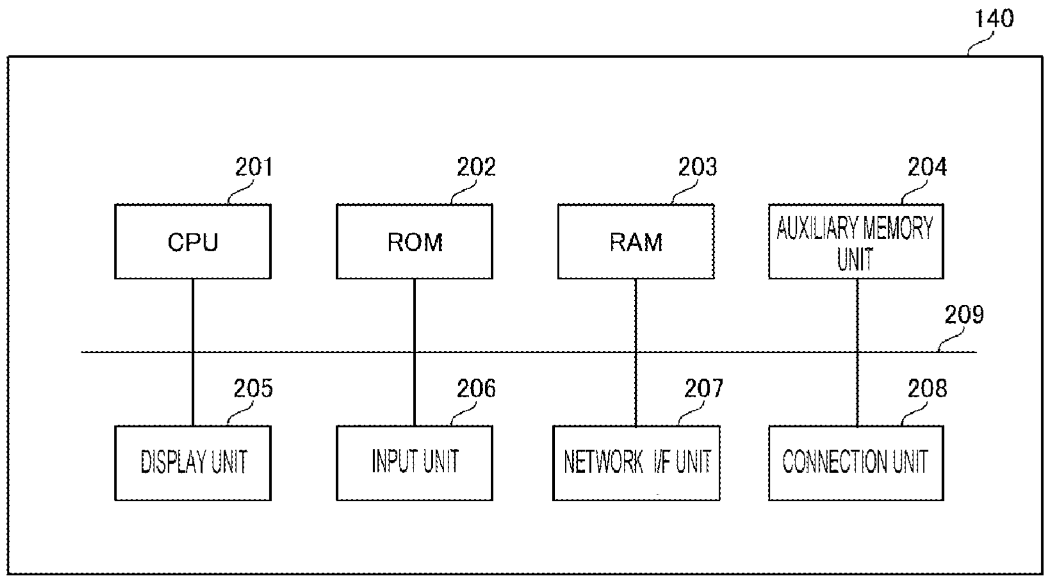
FIG. 2 is a diagram illustrating an exemplary hardware configuration of an information processing apparatus according to an embodiment.

The hardware configuration of the information processing apparatus 140 is now described with reference to FIG. 2. FIG. 2 is a diagram illustrating an exemplary hardware configuration of the information processing apparatus 140. As illustrated in FIG. 2, the information processing apparatus 140 has a central processing unit (CPU) 201, read-only memory (ROM) 202, and random-access memory (RAM) 203. The CPU 201, ROM 202, and RAM 203 construct what is called a computer.

Additionally, the information processing apparatus 140 has an auxiliary memory unit 204, a display unit 205, an input unit 206, a network interface (I/F) unit 207, and a connection unit 208. The hardware components of the information processing apparatus 140 are interconnected via a bus 209.

The CPU 201 is a device that executes various software programs installed in the auxiliary memory unit 204 (e.g., a program for generating a chart, as described later). The ROM 202 is a non-volatile memory. The ROM 202 functions as the main memory device that stores a wide range of system-level programs, data, or other content necessary for the CPU 201 to execute various software programs installed in the auxiliary memory unit 204. Specifically, the ROM 202 holds boot programs such as basic input/output system (BIOS) or extensible firmware interface (EFI).

The RAM 203 is a volatile memory such as dynamic random-access memory (DRAM) or static random-access memory (SRAM). The RAM 203 functions as the main memory device that provides a working area in which various software programs installed in the auxiliary memory unit 204 are loaded upon execution by the CPU 201.

The auxiliary memory unit 204 is an auxiliary memory device that stores various programs or information used upon execution of various programs. The data storage unit 311 and a memory unit 315 (see FIG. 3), which will be described later, are implemented in the auxiliary memory unit 204 or the RAM 203.

The display unit 205 is a display device that presents various screens. The input unit 206 is an input device enabling an inspector to enter various instructions into the information processing apparatus 140.

The network I/F unit 207 is a communication device for establishing a connection to an external network (not illustrated). The connection unit 208 is a connection device that enables the information processing apparatus 140 to connect to other devices.

<Functional Configuration of Information Processing Apparatus>

Figure 3:
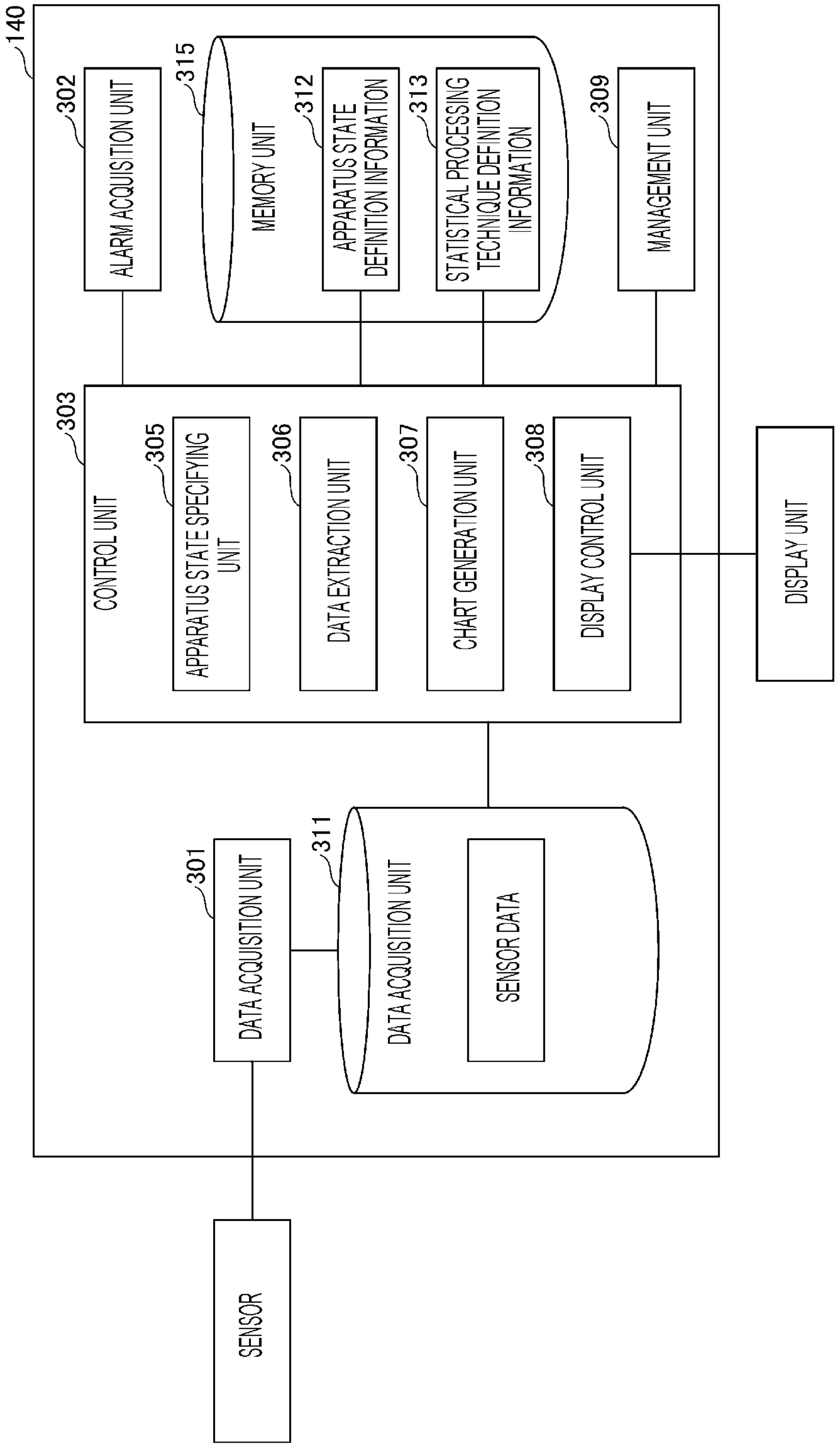
FIG. 3 is a diagram illustrating an exemplary functional configuration of the information processing apparatus according to an embodiment.

The functional configuration of the information processing apparatus 140 is now described with reference to FIG. 3. FIG. 3 is a diagram illustrating an exemplary functional configuration of the information processing apparatus 140. As described previously, the information processing apparatus 140 is installed with the program for generating a chart. Running the program for generating a chart allows the information processing apparatus 140 to function as a data acquisition unit 301, an alarm acquisition unit 302, a control unit 303, and a management unit 309.

The data acquisition unit 301 continuously acquires specific data from multiple data items managed by the substrate processing apparatus 120 and stores it in the data storage unit 311. The data managed by the substrate processing apparatus 120 includes, for example, sensor data obtained by a sensor attached to the substrate processing apparatus 120. The sensor data indicates the state of the substrate processing apparatus 120. The sensor data represents the value obtained through detection by a sensor attached to the substrate processing apparatus 120. Examples of the sensor data encompass various types of data, including but not limited to heater temperature, pressure, gas type, gas flow rate, RF power, valve opening degree, luminescence intensity, time duration of each process step, and rates of temperature increase and/or decrease. Examples of the sensor include a temperature sensor, pressure sensor, mass flow controller, plasma emission monitor, and other similar devices. The sensor data includes process data and process result data obtained from the sensor during substrate processing using a recipe.

Further, the data managed by the substrate processing apparatus 120 may include data indicating the position of a fork or arm of a substrate transfer apparatus, data indicating the torque applied to a pin for lifting a substrate, and other relevant data. It also may include sensor data relating to chambers (e.g., load-lock chamber) other than substrate processing apparatus 120. Such data may be stored in the data storage unit 311 to use as history information for sensor data.

In one example, the data acquisition unit 301 acquires sensor data from a sensor attached to the substrate processing apparatus 120. This configuration enables the storage of history information for sensor data of the substrate processing apparatus 120 in the data storage unit 311. The history information for sensor data of the substrate processing apparatus 120*a* is stored in the data storage unit 311 of the substrate processing apparatus 120*a*, while the history information for sensor data of the substrate processing apparatus 120*b* is stored in the data storage unit 311 of the substrate processing apparatus 120*b*. However, the substrate processing apparatuses 120*a* and 120*b* may store not only the history information for the sensor data obtained from their individual substrate processing apparatus 120, but also the history information for the sensor data obtained from the other piece of substrate processing apparatus 120, in the data storage unit 311.

The alarm acquisition unit 302 continuously acquires alarm information issued when a specific event occurs in the substrate processing apparatus 120. The alarm information includes information regarding the date and time when a specific event occurred. In the present example, the term "specific event" refers to a trouble or malfunction that has occurred in the substrate processing apparatus 120, and the subsequent description will mainly focus on the date and time of the occurrence of the specific event, which will be referred to as "trouble occurrence date and time." However, the specific event is not limited to trouble occurrences and may encompass any type of event, including a specific incident.

The control unit 303 has an apparatus state specifying unit 305, a data extraction unit 306, a chart generation unit 307, and a display control unit 308.

The apparatus state specifying unit 305 refers to the memory unit 315 where the state of the substrate processing apparatus 120 is defined and specifies the state of the substrate processing apparatus 120 at the time upon an occurrence of a specific event. The memory unit 315 stores apparatus state definition information 312 that provides a definition of the state of the substrate processing apparatus 120. The apparatus state definition information 312 provides a definition of individual states of the substrate processing apparatus 120 (see FIG. 7). The apparatus state specifying unit 305 uses the information defined in the apparatus state definition information 312 to specify the state of the substrate processing apparatus 120 at the time upon an occurrence of trouble.

The data extraction unit 306 extracts history information for sensor data detected from the substrate processing apparatus that corresponds to the state of the substrate processing apparatus at a time upon an occurrence of a specific event. In one example, the data extraction unit 306 extracts history information for sensor data detected from the substrate processing apparatus 120 of a state that corresponds to the state of the substrate processing apparatus 120 specified by the apparatus state specifying unit 305. The data extraction unit 306 extracts, among the history information for the sensor data stored in the data storage unit 311, the history information for the sensor data for a specific period including the occurrence date and time of a specific event included in the acquired alarm information. In one example, the data extraction unit 306 extracts, among the history information for the sensor data stored in the data storage unit 311, the history information for the sensor data prior to the occurrence of the trouble or before and after the occurrence of the trouble on the basis of the trouble occurrence data and time included in the acquired alarm information. The extracted sensor data history information is also referred to as "trace data."

The chart generation unit 307 refers to the memory unit 315 with a statistical processing technique defined therein and uses it to generate a chart indicating time-series data subjected to a statistical processing on the sensor data. The memory unit 315 stores statistical processing technique definition information 313 that provides a definition of a statistical processing technique. In one example, the chart generation unit 307 refers to the statistical processing technique definition information 313 to specify a statistical processing technique to be used for generating a chart representing time-series data subjected to a statistical processing on the sensor data. The statistical processing technique definition information 313 provides a definition of the technique to be used for statistically processing the sensor data (refer to FIG. 8). The display control unit 308 causes the generated chart to be displayed on the display unit 205 of the information processing apparatus 140.

The chart generation unit 307 may calculate a score for the generated chart. The display control unit 308 may cause a chart with a score equal to or higher than a threshold among the generated charts and the relevant score to be displayed on the display unit 205.

The management unit 309 may manage the occurrence of a specific event on the basis of a chart that is selected in response to an operation by a user with reference to the displayed score and chart. Alternatively, the management unit 309 may manage the occurrence of a specific event on the basis of a chart that is automatically selected from the displayed chart with reference to the displayed score. The management unit 309 may automatically select the chart with the highest score. In one example, the management unit 309 may set a management value used for detecting the occurrence of a specific event derived from the time-series data indicated by the displayed chart. The management unit 309 may predict the occurrence of a specific event on the basis of the set management value. Such a configuration enables the prevention of the recurrence of a specific event.

One example of a chart representing time-series data subjected to a statistical processing on the history information for the sensor data may include a statistical process control (SPC) chart. In the present embodiment, an SPC chart generation method enables the automated generation of the SPC chart, facilitating automatic data monitoring for preventing the recurrence of a specific event, including trouble. The following describes a conventional manual-based SPC chart generation method and then describes a method of automatically generating an SPC chart according to the present embodiment.

<Conventional Manual-Based SPC Chart Generation Method>

Figure 4:
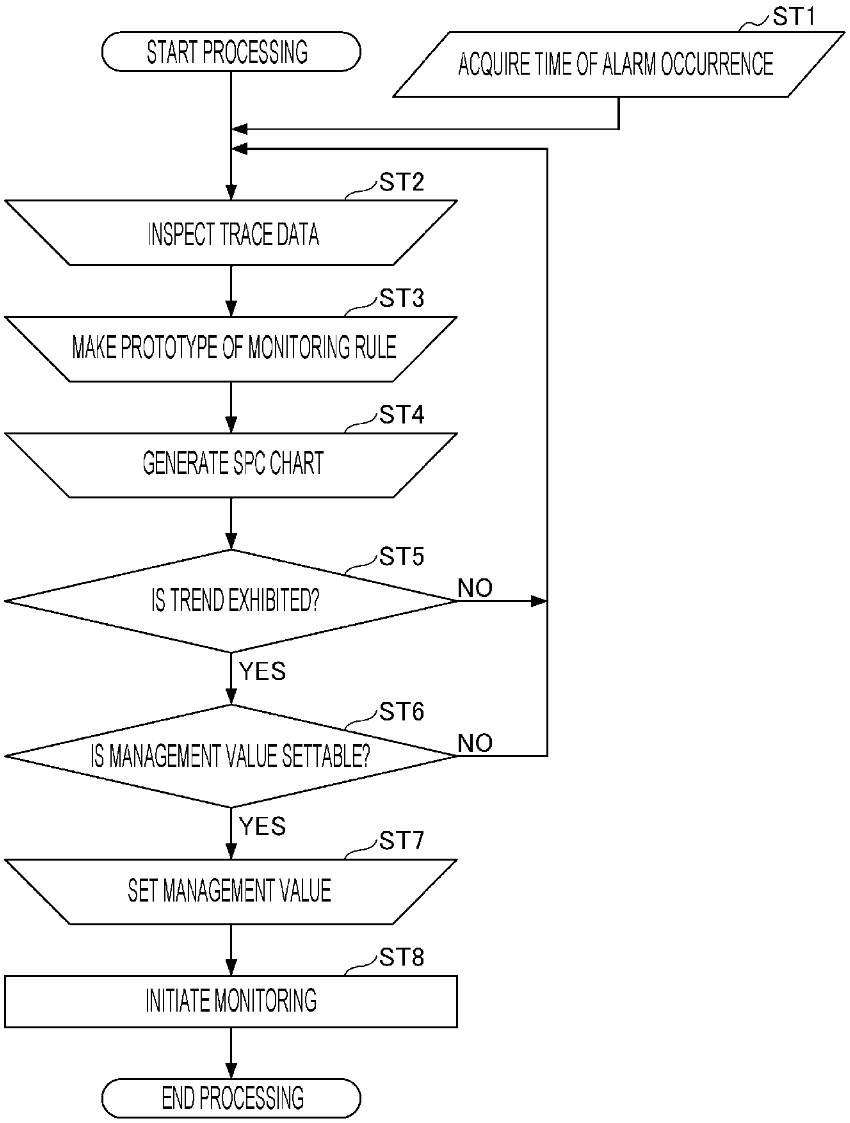
FIG. 4 is a flowchart illustrating an example of a conventional manual-based SPC chart generation method.

The conventional manual-based SPC chart generation method is described by referencing FIG. 4. FIG. 4 is a flowchart illustrating an example of the conventional manual-based SPC chart generation method. In other words, the procedure illustrated in FIG. 4 represents a method of generating an SPC chart performed by an inspector (a human operator). As an example of a specific event, a procedure followed by the inspector in the case of an alarm occurrence in the substrate processing apparatus 120 is described.

Upon the occurrence of an alarm, the inspector acquires the time of alarm occurrence (ST1). The inspector inspects the trace data (sensor data) around the time of alarm occurrence (prior to the alarm occurrence, or before and after the alarm occurrence) to examine or identify which sensor data to use or which segment of the recipe to use for the inspection (ST2).

Then, the inspector makes a prototype of a formula of a processing method for generating an SPC chart, called a monitoring rule (ST3), and uses this formula of the processing method for generating an SPC chart (ST4).

Subsequently, the inspector determines the suitability of a generated SPC chart for monitoring purposes to prevent the recurrence of future alarms, that is, whether the chart exhibits a suitable trend for monitoring (ST5). The determination of whether the SPC chart exhibits a trend suitable for monitoring may be made, for example, by evaluating the resemblance of the SPC chart to an approximate straight line. In addition, this determination may be based on various factors, such as whether the SPC chart exhibits a monotonous increase, whether the SPC chart exhibits a monotonous decrease, or whether a management value described later is only exceeded during the occurrence of an SPC chart alarm.

When it is determined that the generated SPC chart does not exhibit a trend suitable for monitoring, the inspector returns the processing to the step of the inspection of trace data (sensor data) (ST2). Then, the inspector again makes a prototype for the monitoring rule and generates the SPC chart (ST3, ST4), followed by a determination of whether the SPC chart exhibits a trend suitable for monitoring (ST5).

During ST5, when it is determined that the SPC chart exhibits a trend suitable for monitoring, the inspector proceeds to determine the possibility of setting a management value. The management value represents an upper limit value and/or a lower limit value used for issuing a warning to prevent the recurrence of the alarm for the time-series data of the SPC chart.

When the management value is determined to fail to be set, the inspector returns the processing to the inspection of trace data (sensor data) (ST2) and generates a subsequent SPC chart (ST3, ST4).

During ST6, when the management value is determined to be settable, the inspector proceeds to set the management value (ST7), initiates monitoring using the generated SPC chart (ST8), and ends the processing. Consequently, when the time-series data of the SPC chart exceeds the upper limit or lower limit of the management value, the inspector issues a warning to prevent the recurrence of the alarm.

As described above, in the conventional method, the inspector manually performs all tasks, including rule design based on the inspection of trace data, prototype generation, chart generation, prototype result checking, and management value setting. Thus, the generation of the SPC chart is time-consuming, and the performance of the SPC chart is liable to be reliant on the expertise of the engineer. In particular, designing the monitoring rule (ST3) relies significantly on the inspector's skill or experience, sometimes resulting in time-consuming before monitoring may initiate.

Meanwhile, in the SPC chart generation method according to the present embodiment, all tasks from an alarm occurrence to the initiation of monitoring may be automated when there is a discernible tendency in the sensor data for an alarm occurrence. Furthermore, in the SPC chart generation method according to the present embodiment, the SPC chart is automatically generated even after the shipment of the substrate processing apparatus 120, and the monitoring method (monitoring rule) is automatically added. This leads to an increase in the effectiveness of preventing the recurrence of an alarm in the substrate processing apparatus 120 depending on the characteristics of the process.

<SPC Chart Generation Method>

Figure 5:
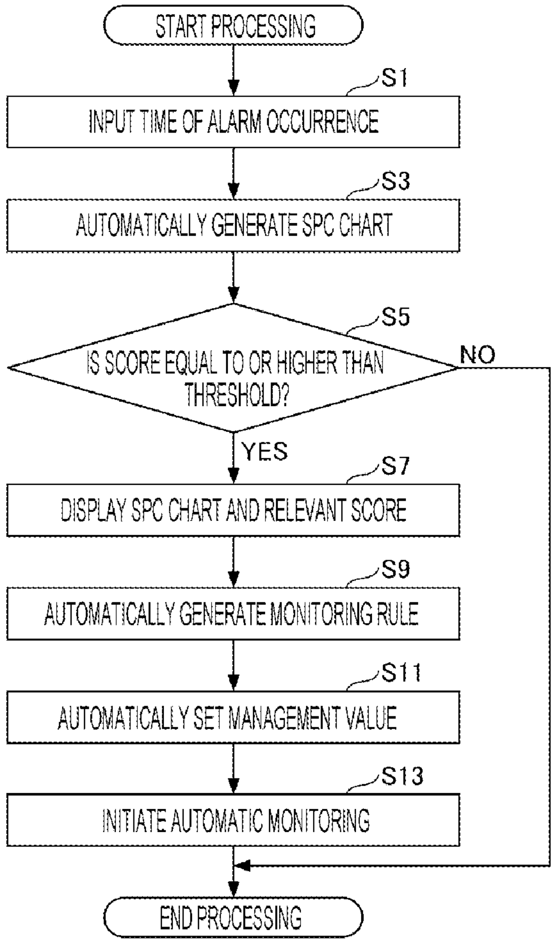
FIG. 5 is a flowchart illustrating an example of an SPC chart generation method according to an embodiment.

The SPC chart generation method according to the present embodiment is described with reference to FIG. 5. FIG. 5 is a flowchart illustrating an example of the SPC chart generation method according to one embodiment. The data acquisition unit 301 acquires sensor data from a sensor attached to the substrate processing apparatus 120 before the processing is executed. This configuration enables the storage of the history information for sensor data of the substrate processing apparatus 120 in the data storage unit 311.

During this processing, upon the occurrence of an alarm, the alarm acquisition unit 302 inputs the time of alarm occurrence (S1). The chart generation unit 307 performs a statistical processing on the sensor data detected from the substrate processing apparatus 120, which corresponds to the state of the substrate processing apparatus 120 at the time of alarm occurrence, to generate an SPC chart automatically (S3). This automatic generation of the SPC chart will be described later with reference to FIG. 6.

The chart generation unit 307 calculates a score for the SPC chart.

When it is determined that no SPC chart has a calculated score equal to or higher than a threshold, the display control unit 308 ends the processing. Meanwhile, when it is determined that an SPC chart is found with a calculated score equal to or higher than the threshold, the display control unit 308 causes the SPC chart and the relevant score to be displayed (S7). In the case where multiple SPC charts are found with a calculated score equal to or higher than the threshold, the display control unit 308 causes the multiple SPC charts and their relevant scores to be displayed. The SPC charts may be sorted and displayed in descending order by their scores.

The inspector selects the SPC chart that is determined as optimal by referring to the displayed score and SPC chart. Alternatively, the management unit 309 may automatically select the SPC chart with the highest score. The management unit 309 initiates automatic monitoring using the SPC chart selected in response to the operation by the user (inspector) or the SPC chart automatically selected (S9, S11, and S13).

To initiate monitoring, the management unit 309 automatically generates a monitoring rule program for generating an SPC chart to be used for monitoring (S9). The monitoring rule program is an application designed to generate an SPC chart and incorporate it into an existing system, enabling the use of the automatically generated SPC chart.

Subsequently, the management unit 309 automatically sets a management value for preventing the recurrence of alarms using the time-series data of the statistical value derived from the sensor data indicated by the SPC chart (S11) and initiates the monitoring (S13). The management unit 309 predicts the occurrence of an alarm on the basis of the set management value, making it possible to prevent the recurrence of the alarm.

Figures 6, 7:
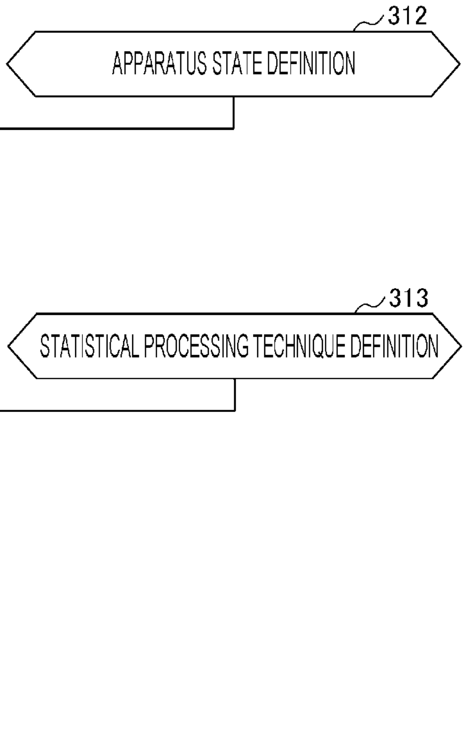
FIG. 6 is a flowchart illustrating the details of the automatic generation of the SPC chart depicted in FIG. 5.
FIG. 7 is a diagram illustrating an example of an apparatus state definition information.

FIG. 6 is a flowchart illustrating the details of the automatic generation of the SPC chart presented in S3 of FIG. 5. The memory unit 315 pre-stores the apparatus state definition information 312 (FIG. 7) in which the apparatus state is defined and the statistical processing technique definition information 313 (FIG. 8) in which the statistical processing technique used to generate the SPC chart is defined.

The apparatus state specifying unit 305 refers to the apparatus state definition information 312 to specify which apparatus state the substrate processing apparatus 120 upon the alarm occurrence corresponds to (S31). Referring to FIG. 7, the state of the substrate processing apparatus 120 upon the alarm occurrence is determined to correspond to the "leak checking" state, for example, when all gas flows are halted, and the pressure within the substrate processing apparatus 120 is one Pa (pascal) or less.

Subsequently, the data extraction unit 306 extracts history information for the sensor data detected from the substrate processing apparatus 120 that corresponds to the specified state of the substrate processing apparatus 120. The sensor data history information is extracted from the sensor data detected from the substrate processing apparatus 120 that corresponds to the specified state of the substrate processing apparatus 120 among the sensor data items obtained during past executions of substrate processing using the same recipe (S33). When there are multiple substrate processing tasks executed in the past using the same recipe, a large number of sensor data may be extracted.

Subsequently, the chart generation unit 307 refers to the statistical processing technique definition information 313 to automatically select a technique to be used for statistically processing the extracted sensor data history information. Then, the chart generation unit 307 uses the selected statistical processing technique to generate an SPC chart (S35). The SPC chart may be automatically generated for the respective history information items of multiple types of extracted sensor data.

In one example, the sensor data obtained in the past around the time point upon the occurrence of trouble in the substrate processing apparatus 120 is extracted, and multiple SPC charts are automatically generated. The data extraction unit 306 extracts the segment of the recipe executed by the substrate processing apparatus 120 that corresponds to the specified state of the substrate processing apparatus 120 around the trouble occurrence time and extracts the history information for the sensor data detected in the segment. For example, in the case of using sensor data for a duration of five minutes starting from 30 minutes after the initiation of a recipe, historical information for the sensor data for this period of five minutes extracted when a plurality of substrates is processed using the same recipe is extracted. The sensor feature table presented in FIG. 9 represents exemplary results obtained by the statistical technique for sensor data such as gas flow rates controlled by a mass flow controller (MFC).

When the mean measurement is automatically selected as the statistical processing technique to be used for the extracted sensor data of the gas flow rate, an SPC chart is automatically generated. This SPC chart represents, as the mean, the gas flow rate controlled by the MFC for a duration of five minutes starting from 30 minutes after the initiation of the recipe. When the standard deviation measurement is automatically selected as the statistical processing technique, an SPC chart is automatically generated. This SPC chart represents the standard deviation of the gas flow rate controlled by the MFC for a duration of five minutes starting from 30 minutes after the initiation of the recipe.

In FIG. 9, the sensor data of gas flow rates controlled by MFC-01 was collected for a duration of five minutes starting from 30 minutes after the initiation of the recipe. The sensor data underwent four types of statistical processing techniques, namely, mean, maximum, minimum, and standard deviation. This resulted in obtaining different trend scores ranging from 0 to 1. The alarm scores are also calculated within the range of 0 to 1. As will be described later, when there are no false alarms in the statistical values, the alarm score is set to one. The alarm score gradually approaches zero as the number of false alarms in the statistical values increases. The trend score is calculated using a linear regression model, such as the least squares method.

Figure 10:
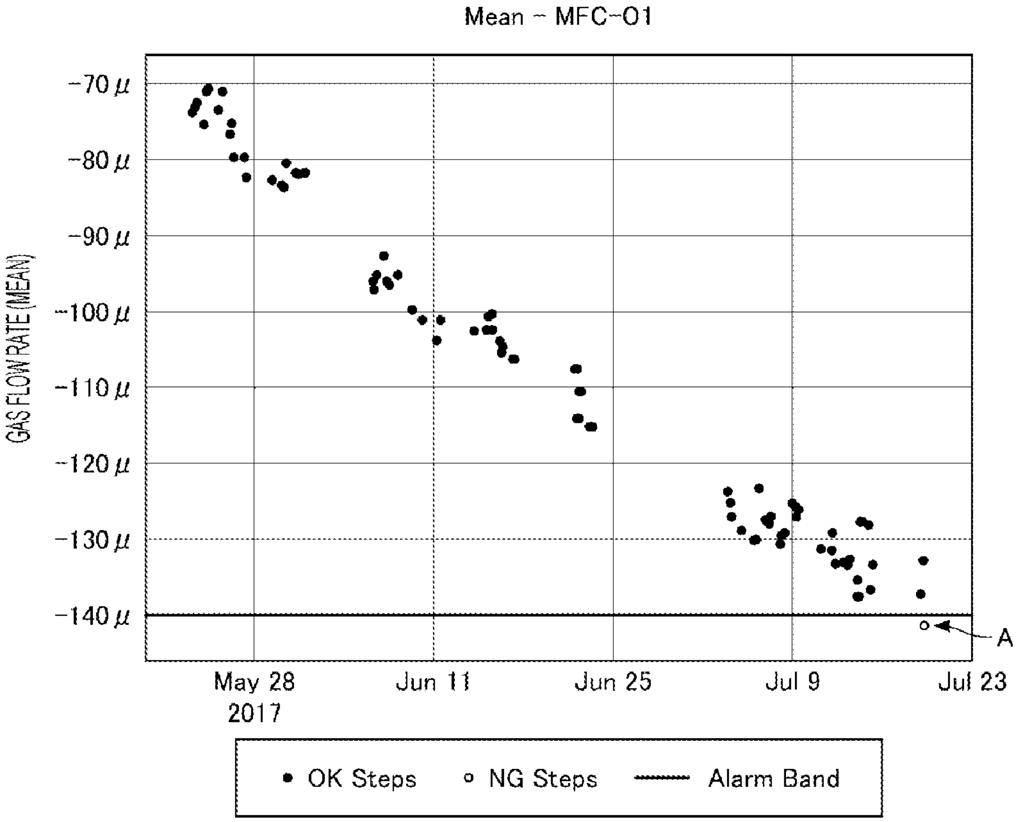
FIG. 10 is a diagram illustrating an example of an automatically generated SPC chart.

FIG. 10 illustrates an exemplary SPC chart. In this SPC chart, the horizontal axis represents the date and time (time), and the vertical axis represents the mean of gas flow rates. The mean of the gas flow rates (MFC-01 in FIG. 9) is an example of the statistical value, which may be derived from the standard deviation of the gas flow rate or other sensor data subjected to a statistical processing.

Referring back to FIG. 6, the chart generation unit 307 calculates a trend score indicating the consistency of chart tendency and an alarm score indicating alarm detection accuracy for all generated SPC charts (S37) and ends this processing.

In FIG. 9, the sensor feature table shows examples of the alarm score and the trend score for each sensor data. The alarm score is used to assess the accuracy of the management value for issuing a warning to prevent the recurrence of an alarm. The trend score is used to evaluate the validity of the calculated statistics on the basis of the assumption that an accurate segment and an appropriate statistical technique will result in a more consistent chart tendency.

The example depicted in FIG. 10 illustrates the provision of a management value (represented by the line labeled Alarm Band in FIG. 10) used for issuing a warning to prevent the recurrence of an alarm. As described above, in the case where a management value is set in the SPC chart, when there exists a statistical value that exceeds the management value not only at the time of the current alarm occurrence but also at other instances, any statistical value exceeding the management value at times other than the current one is regarded as a false alarm. Thus, the count of false alarms is tallied, and the alarm score is calculated accordingly. In the given example of FIG. 10, there is no statistical value exceeding (or falling below) the management value other than a statistical value A (the mean of gas flow rate) of the time of the current alarm occurrence. Thus, the alarm score for the SPC chart at this time is calculated as "1." The alarm score approaches zero (0) as the number of statistical false alarms increases.

The SPC chart is a graphical representation of sensor data around the time of alarm occurrence. The SPC chart may be used to monitor situations where the alarm is likely to reoccur, allowing for warning notifications to prevent the recurrence before the alarm recurs. Specifically, a management value is set, and the management unit 309 initiates monitoring the substrate processing apparatus 120. Upon initiation, the management unit 309 generates a program that executes a monitoring rule that calculates statistical values of sensor data (e.g., the mean of gas flow rates). In addition, the management unit 309 sets a management value (alarm band) for the program. The management unit 309 plots the sensor data acquired from a sensor following a program that executes the monitoring rule. The management unit 309 issues a warning notification to prevent the alarm from recurring when the plot exceeds the management value.

The substrate processing apparatus 120 is stopped at the time of alarm occurrence through the alarm acquired by the alarm acquisition unit 302. Thus, the management unit 309 notifies this warning immediately before the substrate processing apparatus 120 comes to a stop. This warning notification may be displayed on the display unit 205, providing a prompt for maintenance.

The SPC chart generation method according to the present embodiment automates the entire process from the occurrence of an alarm to the initiation of monitoring when there is a tendency observed in the sensor data leading up to the alarm. This configuration enables the prevention of the alarm recurrence for the substrate processing apparatus 120 by using the automatically generated SPC chart. An example of such a tendency exhibited in the sensor data is the case where the statistical values of the sensor data exhibit a trend, such as a tendency for statistical values of the sensor data to decrease, as illustrated in FIG. 10.

Further, in the SPC chart generation method according to the present embodiment, the SPC chart is automatically generated even after the shipment of the substrate processing apparatus 120, and the monitoring technique is automatically added. This configuration enhances the rate of alarm recurrence prevention for the substrate processing apparatus 120, adapting to the process characteristics.

Multiple SPC charts are automatically generated on the basis of the time upon the occurrence of an alarm in the substrate processing apparatus 120, and the performance of each chart is scored using a pre-set indicator, enabling the inspector to just select the SPC chart with the higher score, which is considered to be the most appropriate. Alternatively, it is possible to automate monitoring for the prevention of the alarm recurrence by automatically using the one with the highest score. This configuration allows for the generation of a chart for monitoring (such as an SPC chart that represents an alarm-triggering state) within a short timeframe.

In one example, when increasing the temperature inside the substrate processing apparatus 120, a temperature sensor is used to measure the temperature inside the apparatus. When the increase in temperature within the apparatus fails to reach the target temperature within the specified time, an alarm is issued. In such a case, the management unit 309 automatically generates an SPC chart on the basis of the statistical value (e.g., mean value) derived from the history information of the temperature sensor (history information of the temperature sensor of a large number of runs, namely process executions).

The management unit 309 predicts that the temperature increase will not be achieved within the specified time when the angle of transition in temperature in the automatically generated SPC chart is small, and notifies the alarm to prevent recurrence before the next run (process execution).

The temperature inside the apparatus takes time to rise. Thus, by monitoring for approximately five minutes before the alarm occurrence time, the overall situation may be understood. Consequently, it is sufficient for the management unit 309 to monitor only just before the time of alarm occurrence (e.g., 20 seconds before the alarm occurrence).

The sensor data is collected even when the substrate processing apparatus 120 is not operational. The collected data may also be used to predict abnormalities during substrate transfer. In one example, during the transfer of a substrate from the load-lock chamber to the substrate processing apparatus 120, it is determined whether the oxygen concentration in the load-lock chamber is less than or equal to a specific concentration value using an oximeter provided in the load-lock chamber. When the condition is met, the boat carrying multiple substrates is introduced into the load-lock chamber. In case the oximeter is broken, an alarm is issued. Thus, it is beneficial to detect any signs of abnormal fluctuations in the oxygen concentration within the load-lock chamber before issuing this alarm, namely, before introducing the boat into the load-lock chamber. This detection may be achieved by analyzing the automatically generated SPC chart using the history information for sensor data other than the oximeter. Notifying a warning for recurrence prevention prior to introducing the boat into the load-lock chamber makes it possible to prevent stoppages in the substrate processing apparatus 120. The SPC chart automatically generated in this manner may be used not only during process execution but also in the transfer process such as substrate loading into the substrate processing apparatus 120 and within the load-lock chamber.

In one example, the chart generation method includes extracting history information for sensor data detected from an apparatus that corresponds to the state of the apparatus at the time upon an occurrence of a specific event, generating a chart representing time-series data obtained by statistically processing the extracted sensor data history information with reference to a memory unit with a statistical processing technique defined, and displaying the generated chart on a display unit. The apparatus may be any one of a substrate processing apparatus, a transfer apparatus, and a load-lock chamber.

The substrate processing apparatus according to the present disclosure may be applied to any type of apparatuses that use a technique such as atomic layer deposition (ALD), capacitively coupled plasma (CCP), inductively coupled plasma (ICP), radial line slot antenna (RLSA), electron cyclotron resonance plasma (ECR), and helicon wave plasma (HWP). The substrate processing apparatus according to the present disclosure may also be applied to any apparatus that utilizes chemical vapor deposition (CVD) or oxidation and annealing techniques.

The versatility of the substrate processing system 100 according to the present disclosure is apparent, as it is not limited to the system illustrated in FIG. 1. Numerous system configuration examples exist depending on different uses and purposes.

The substrate processing apparatus according to the present disclosure is applicable to various types of apparatuses, including a single-wafer apparatus that processes substrates individually, a batch apparatus that processes multiple substrates simultaneously, and a semi-batch apparatus.

The substrate processing apparatus according to the present disclosure is capable of performing various substrate processing tasks, including film deposition and etching.

According to one aspect, it is feasible to automatically generate data used for preventing the recurrence of a specific event.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A chart generation method comprising:

automatically extracting, by a controller, history information for sensor data detected from an apparatus corresponding to a state of the apparatus, the state of the apparatus being determined based on apparatus-state definition information stored in a memory at a time when a specific event has occurred;

generating, by the controller, a chart representing time-series data obtained by statistically processing the extracted history information using a statistical processing technique selected based on the apparatus-state definition information stored in the memory; and controlling, by the controller, a display to first display the generated chart.

2. The chart generation method according to claim 1, further comprising:

repeating, by the controller, the generating a plurality of times thereby generating a plurality of charts;

calculating, by the controller, a score for each of the plurality of charts; and controlling, by the controller, the display to second display, among the plurality of charts, a chart that has a score equal to or higher than a threshold value and the score itself on the display.

3. The chart generation method according to claim 2, further comprising:

managing, by the controller, an occurrence of the specific event, based on a chart selected in response to an operation by a user from the score and chart displayed in the controlling the display to second display.

4. The chart generation method according to claim 2, further comprising:

managing, by the controller, an occurrence of the specific event, based on a chart automatically selected from the chart displayed in the controlling the display to second display, based on the score displayed in the controlling the display to second display.

5. The chart generation method according to claim 1, further comprising:

setting, by the controller, a management value used for detecting the occurrence of the specific event from the time-series data indicated by the displayed chart; and based on the management value, predicting, by the controller, the occurrence of the specific event.

6. The chart generation method according to claim 1, further comprising:

specifying, by the controller, the state of the apparatus at the time when the occurrence of the specific event has occurred with reference to the memory that defines the state of the apparatus; and extracting, by the controller, history information for sensor data detected from an apparatus that corresponds to the state of the apparatus specified in the specifying.

7. The chart generation method according to claim 1, further comprising:

extracting, by the controller, a segment of a recipe executed by the apparatus that corresponds to the state of the apparatus specified in the specifying, from the time when the specific event has occurred, and extracting, by the controller, history information for sensor data detected in the segment.

8. The chart generation method according to claim 1, wherein the apparatus is one of a substrate processing apparatus, a transfer apparatus, and a load-lock chamber.

9. The chart generation method according to claim 1, wherein the statistical processing technique is selected from a plurality of statistical processing techniques stored in the memory.

10. The chart generation method according to claim 1, wherein the history information includes the sensor data detected in a predetermined period before and after the occurrence of the specific event.

11. The chart generation method according to claim 1, further comprising:

automatically selecting, by the controller, the statistical processing technique from among a plurality of statistical processing techniques stored in the memory, and the generating comprising generating the chart by applying the automatically selected statistical processing technique to the extracted history information.

12. The chart generation method according to claim 1, further comprising:

extracting, by the controller, from among a plurality of past runs of the apparatus in which a plurality of processes has been respectively performed, history information corresponding to the state of the apparatus determined at the time when the specific event has occurred.

13. An information processing apparatus comprising:

a memory configured to define a statistical processing technique; and a controller coupled to the memory and configured to:

automatically extract history information for sensor data detected from an apparatus corresponding to a state of the apparatus, the state of the apparatus being determined based on apparatus-state definition information stored in a memory at a time when a specific event has occurred;

generate a chart representing time-series data obtained by statistically processing the extracted history information using the statistical processing technique selected based on the apparatus-state definition information stored in the memory; and control a display to display the generated chart.

* * * * *